3,145,363
ECHO-SOUNDING EQUIPMENT
Roy William George Haslett, Hillington, Glasgow, Scotland, assignor to Kelvin & Hughes Limited, Hillington, Glasgow, Scotland, a British company
Filed Mar. 15, 1961, Ser. No. 95,962
Claims priority, application Great Britain Mar. 21, 1960
8 Claims. (Cl. 340—3)

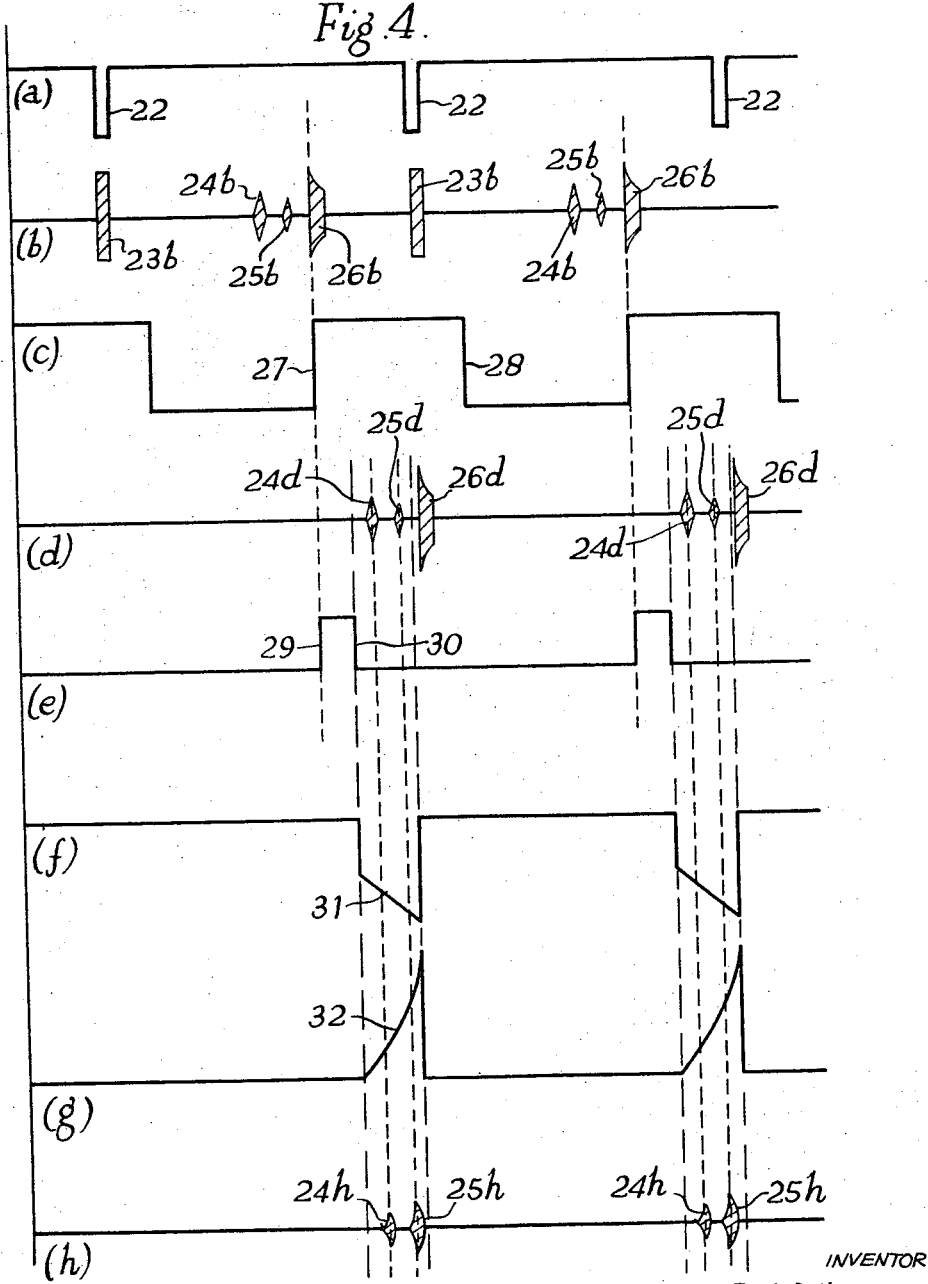

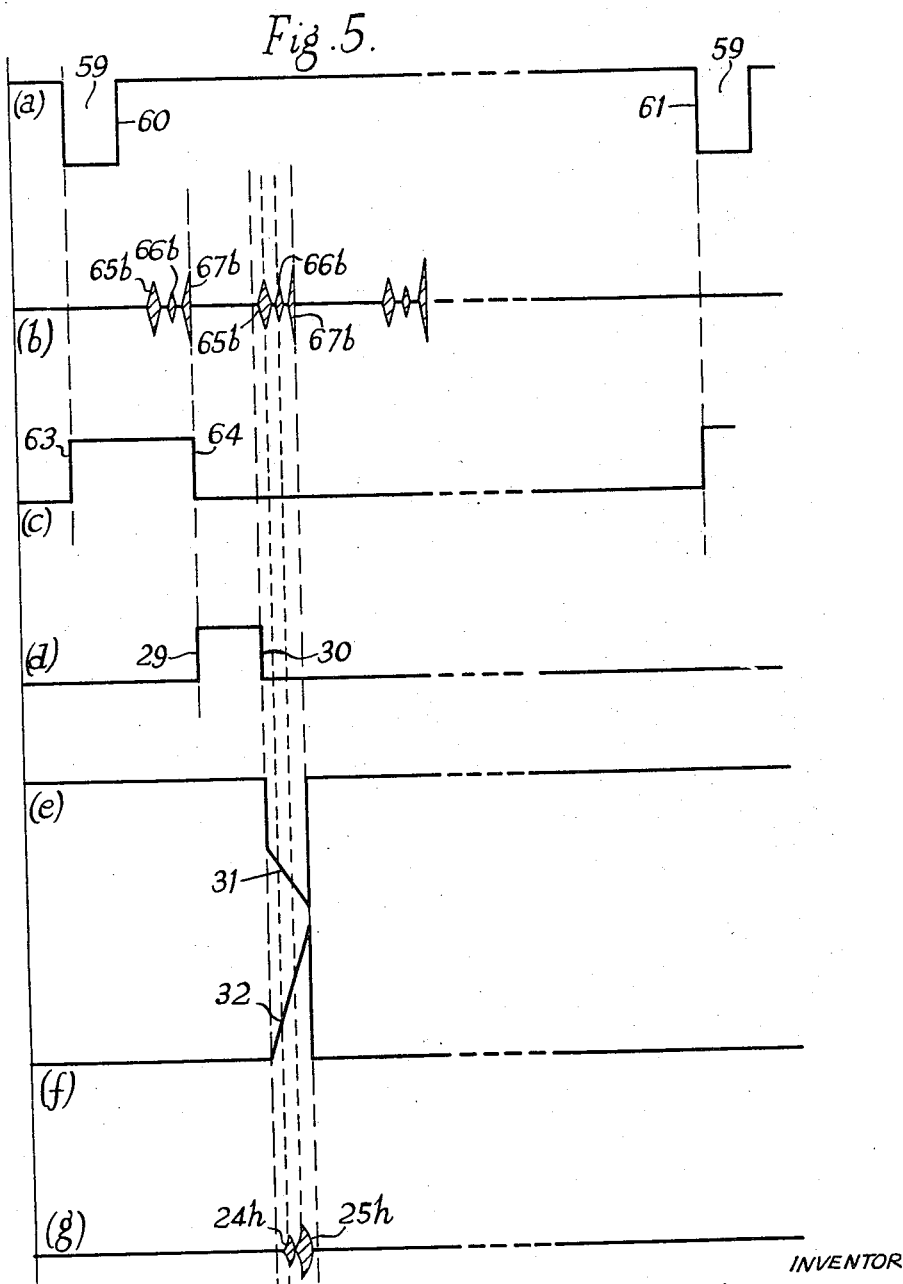

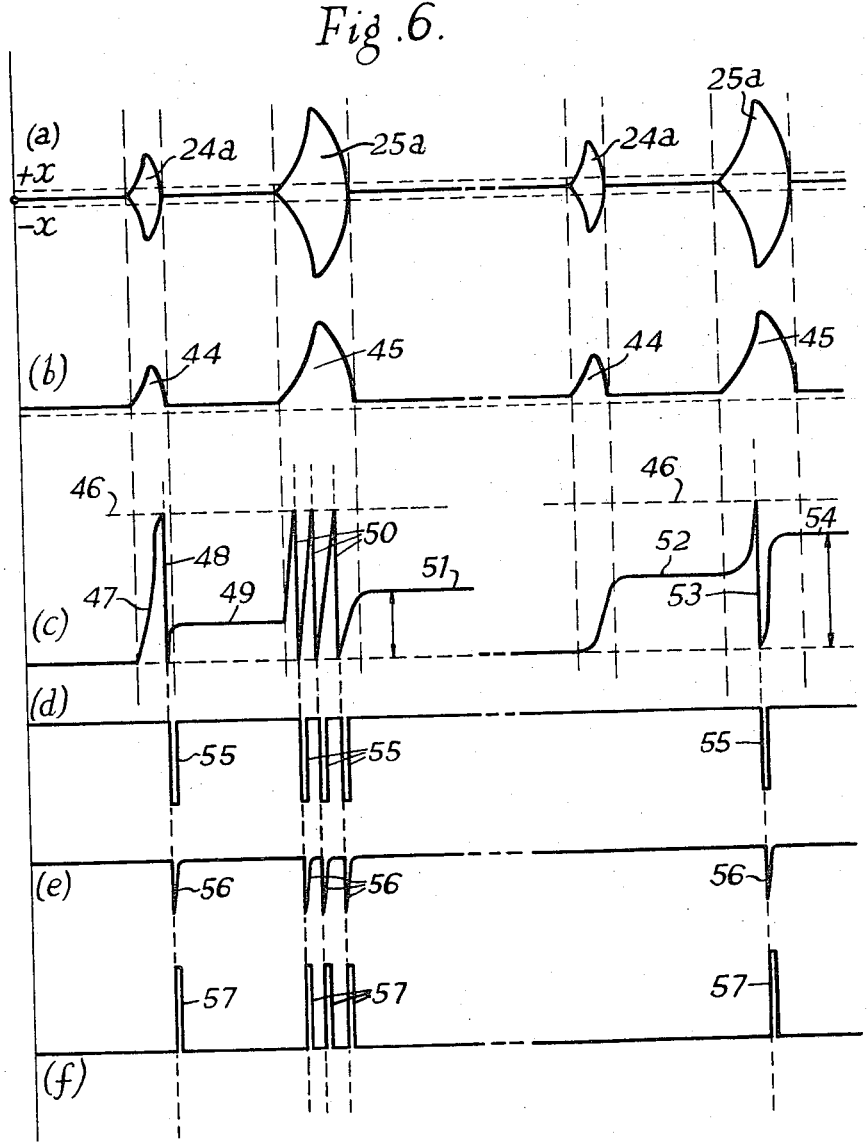

The present invention relates to echo-sounding equipment and particularly to sub-aqueous sonic or ultrasonic echo-sounding equipment for the detection of fish.

Equipment of this kind has been proposed in which pulses of sonic or ultrasonic wave energy are transmitted into the sea by means of a transducer and the variation of the strength of received echo signals with the depth from which they originate is displayed, for example on the screen of a cathode ray tube, and/or recorded, for example by magnetic recording or by means of a pen recorder. Such a display indicates the presence of fish and the number and/or the strength of the echoes give some indication of the number and size of fish present at various depths. It is not however a reliable indication of the number of fish which are likely to be caught by a trawl.

Theoretical considerations indicate that the probability of catch represented by the ratio of the number or weight of fish caught to the number of fish "seen," that is to say indicated by the display, will be a function of radius from the transducer within the range of depths covered by the height of the trawl.

In the drawings, FIG. 1 is a diagram indicating the reason why the number of fish seen and the number of fish caught are not directly related. In this drawing HLNM represents the trawl, HL being the headline and the lower edge NM being assumed coincident with the sea bed. T is the transducer on the ship from which the sonic or ultrasonic waves are radiated and by which they are received after reflection and S is the foot of the normal to the sea-bed (assumed flat) through the transducer T. Let the effective part of the acoustic beam be contained within a cone with its apex at T, as shown in FIGURE 1. Fish $F_1$, $F_2$ and $F_3$ at radii $r_1$, $r_2$ and $r_3$ from the transducer T are examples of three causes which may arise:

(1) $F_1$ is a fish which will be caught by the trawl HLNM but is outside the beam and will not be detected.

(2) $F_2$ is a fish which will be detected at a radius $r_2$ greater than the depth of the headline below the transducer but is in fact above the headline and will therefore not be caught, and (3) $F_3$ is at a radius $r_3$ greater than the depth of the seabed below the transducer and the small echo from such fish will be obscured by the large bottom echo from the same radius.

The following factors have also to be taken into account:

(a) The change in the relative widths of the trawl and the beam with the depth of the trawl.

(b) The fact that the greater width of the beam at greater depths results in the reception of more echoes from a single target as it crosses the width of the beam.

(c) The spreading of the energy of the beam over a part-spherical wave front and its absorption in the sea.

It is an object of the present invention to provide echo-sounding equipment capable of providing an estimate based on a sampling technique of the quantity of fish which can be expected to be caught rather than merely of the quantity of fish present. The advantages of such an estimate in enabling a large catch to be made in a short time need no stressing.

According to the present invention there is provided echo-sounding equipment for the detection of fish including sonic or ultrasonic generating and receiving apparatus for transmitting pulses of sonic or ultrasonic wave energy into the sea and converting wave energy reflected from objects in the sea into electrical echo signals, a receiver amplifier connected to the said apparatus to amplify the echo signals, a correction circuit connected to apply an amplitude-correction control waveform to the receiver amplifier to increase the amplification of the echo signals in accordance with the range from which they are received in such a manner as to compensate for the spread of the transmitted wave energy and its absorption in the sea, a selection circuit adapted to select from the echo signals a reference trigger signal originating from a reference depth, a weighting circuit responsive to the reference trigger signal to generate a weighting control waveform representative of the dependence of the probability of catch on depth and to modify the echo signals in accordance with this weighting signal, and an indicator arranged to indicate the accumulated magnitude of the corrected and weighted signals.

Preferably the received echo signals are also subjected to a modification to take account of the relative widths of the beam and the trawl, which depend upon the depth of the trawl below the transducer and introduce a multiplication factor representing the ratio of the quantity of fish within the beam to the quantity within the width of the trawl, and the change in the number of echoes received from any given target with the width of the beam, which again depends upon the depth below the transducer of the region examined. This modification can conveniently be effected by suitably adjusting the control waveform applied to the receiver amplifier but may if desired be applied to the echo signals at a later stage.

Preferably also the equipment includes a delay device in the form of a magnetic recording device for delaying the echo signals, means for initiating reproduction of the delayed signals on receipt of an echo from the sea bed, and a weighting amplifier in the weighting circuit whose gain is controlled by the weighting waveform to vary the amplification of the delayed signals.

Specific embodiments of the invention will now be described by way of example with reference to the accompanying drawings, in which.

Figure 1:
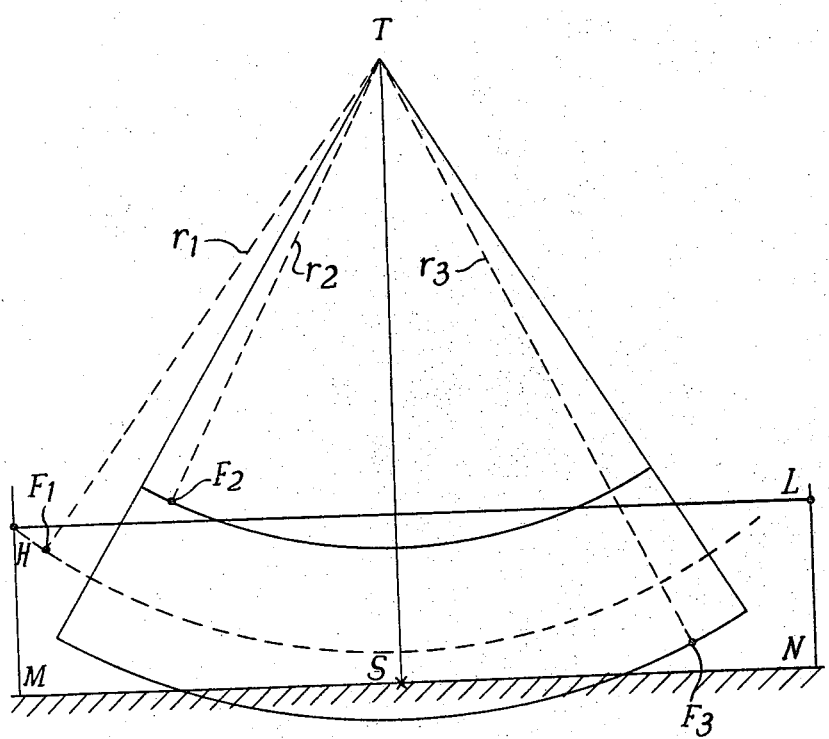
Figure 2:
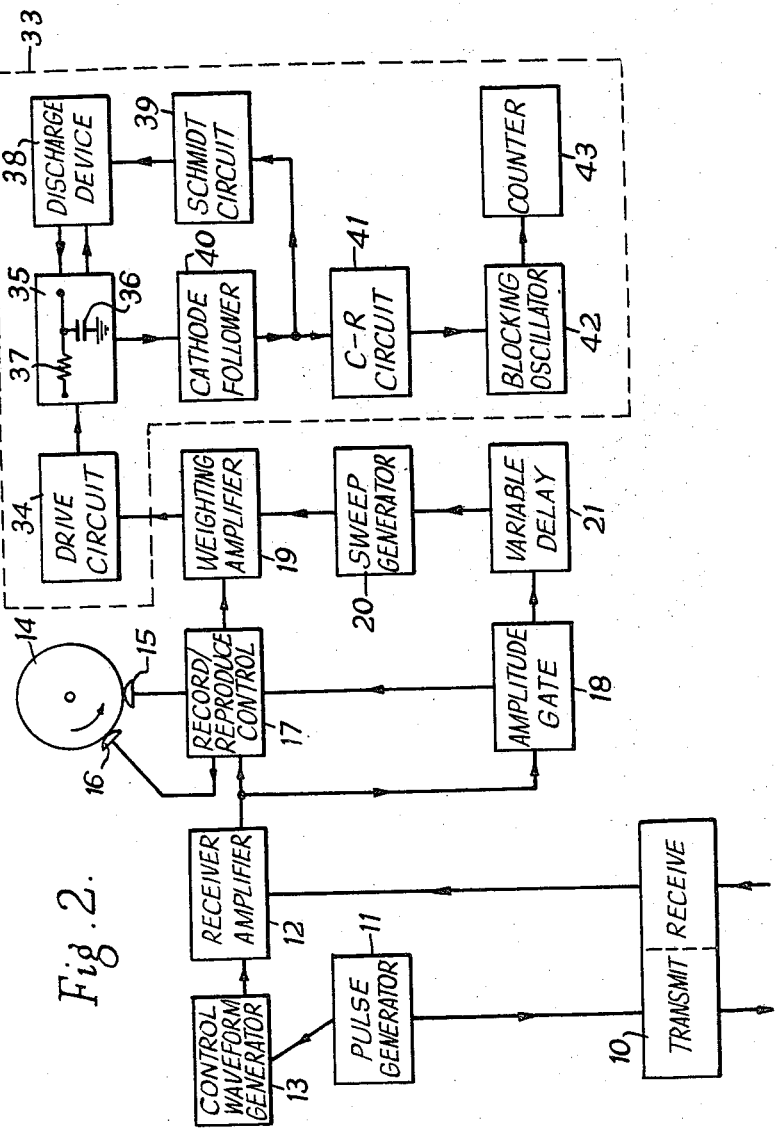
FIG. 2 is a block circuit diagram of one embodiment of the invention.
Figure 3:
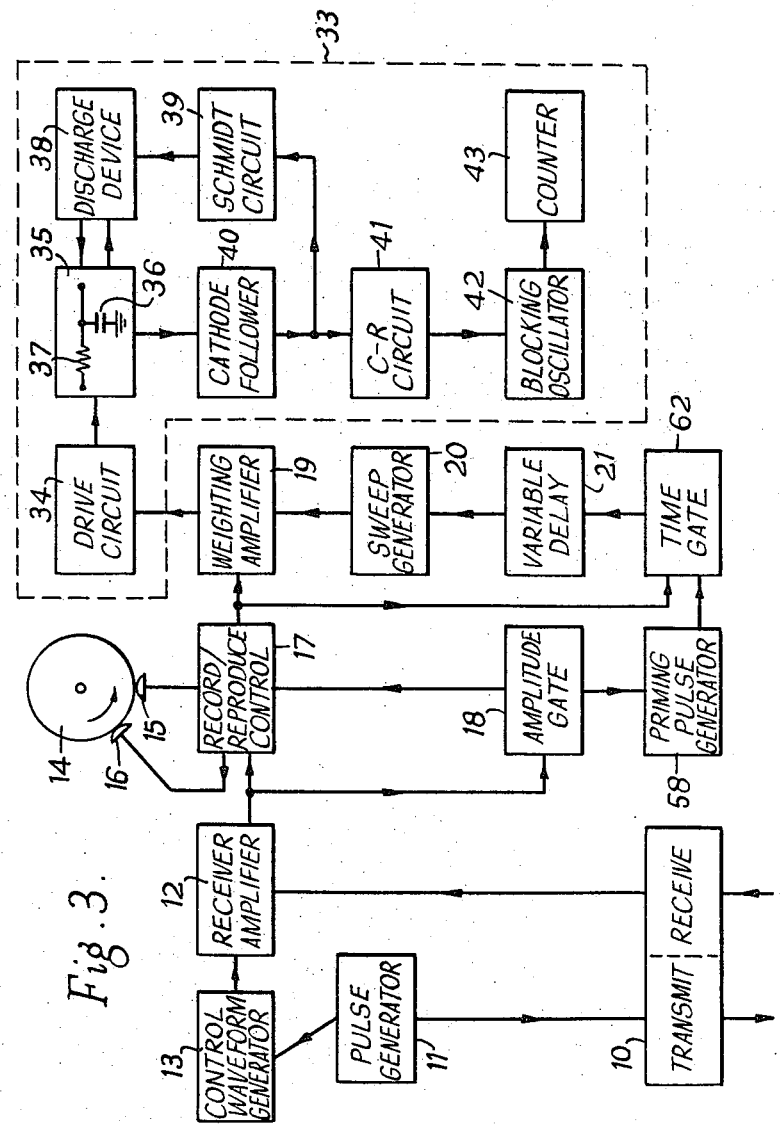
FIG. 3 is a block circuit diagram of a second embodiment.

FIG. 4 shows idealised waveforms illustrating the operation of the correction, delay, and weighting parts of the equipment of FIG. 2, FIG. 5 shows idealised waveforms illustrating the operation of the correction, delay, and weighting parts of the equipment of FIG. 3, and FIG. 6 shows idealised waveforms illustrating the operation of the counting indicator which is common to the equipment of FIGS. 2 and 3.

Referring now to FIG. 2, the echo-sounding equipment shown includes conventional transmitting and receiving apparatus 10 including one or more electromechanical transducers for transmitting sonic or ultrasonic wave energy into the sea and receiving the energy back scattered by objects in the sea, such as fish, and by the sea-bed. The sonic or ultrasonic wave energy is transmitted in the form of pulses under the control of a pulse generator 11. The energy is transmitted into the sea in the form of a divergent beam and the spread of the energy over a part-spherical wave front reduces the intensity incident on targets in inverse proportion to the square of the range from the transducer. Similar spreading of the return energy results in echoes arriving at the receiving transducer from a small target such as a fish whose intensity is inversely proportional to the fourth power of the range of the target from the transducer. The echo intensity is also subject to a reduction with distance due to absorption and scattering of the beam in the water.

To overcome the resulting variations of amplitude with target range the received echo signals are amplified by a receiver amplifier 12 whose gain is controlled by a correction circuit in the form of a control waveform generator 13. The control waveform generator 13 is connected to the pulse generator 11 and is triggered by each pulse, at the same time that an ultrasonic pulse is transmitted, to generate a gain control signal varying with time in such a manner as to sweep the gain of the receiver amplifier 12 through increasing values and thus amplify echo signals received from increasing ranges to such an extent as to compensate for the above decrease in strength.

The output from the swept-gain receiver amplifier 12 thus represents the echo signals in a form in which their relative amplitudes are dependent on the size and back-scattering characteristics of the reflecting surfaces. This output is applied to a magnetic recording device serving as a delay device and comprising a rotary recording drum 14, a record/reproduce head 15, and an erase head 16, whose operation is controlled by a record/reproduce control circuit 17. When the control circuit 17 is set for recording, the record/reproduce head 15 is supplied with a recording bias and is connected to the receiver amplifier 12 and the erase head 16 is supplied with an erasing oscillation to erase previously recorded matter from the surface of the drum 14 before it passes under the head 15.

The output of the receiver amplifier 12 is also connected to an amplitude gate 18 which acts as a selection circuit to select a reference trigger signal from the received echo signals. The amplitude gate 18 is adjusted to select as a reference trigger signal the large-amplitude echo signal from the sea bed, that is the bottom echo signal. This bottom echo signal is employed to initiate reproduction of the delayed echo signals recorded on the recording drum 14 in accordance with the invention of application Serial No. 560,820. The bottom echo signal from the amplitude gate is applied to the control circuit 17 to initiate switching from the recording condition to the reproducing condition of the recording device. In the reproducing condition the erasing oscillation and the recording bias, which may be supplied by a common high frequency generator, are cut off from the erase head 16 and the record/reproduce head 15, respectively, and the latter serves as a reproducing head which is connected to a weighting amplifier 19. The fish echo signals which arrived before the bottom echo signal corresponding to the same transmitted pulse and were recorded on the drum are now reproduced in the order of their arrival, that is to say with the ones from the smallest depths first, followed by the recorded bottom echo. The speed of rotation of the drum is arranged to be such that echoes of one transmitted pulse from the whole range of depths being examined are recorded in a single rotation of the drum.

As explained above the number or quantity of fish seen by the sonic or ultrasonic beam does not correspond to the probable catch. A probability curve can be calculated which indicates that the probability of catch increases rapidly close to the sea bed and usually increases with depth from the head line of the trawl. To obtain an indication of the probable catch the received echo signals, after correction for change of amplitude with depth, must be weighted in accordance with the variation of probability of catch with depth within the range of depths covered by the height of the trawl.

For this purpose the gain of the weighting amplifier 19 is varied with time by means of a weighting signal derived from a sweep generator circuit 20. The sweep generator circuit 20 is triggered through a variable delay circuit 21 by the bottom echo reference signal selected by the amplitude gate 18.

Referring now to FIG. 4, the waveform (a) represents the pulses 22 generated by the pulse generator 11 and the envelope of the pulses of sonic or ultrasonic wave energy transmitted into the sea. The waveform (b) represents the output of the receiving transducer of the transmitting and receiving apparatus 10, including breakthrough signals 23b from the transmitted pulses 22, fish echo signals 24b and 25b and a bottom echo signal 26b. The breakthrough signals 23b are gated out in well-known manner and are not transmitted to the receiver amplifier 12.

The waveform (c) represents the control waveform generated by a multivibrator or the like in the control circuit 17. The positive-going edges 27 of the control waveform are triggered by the bottom echo signal 26 selected by the amplitude gate 18 and initiate reproduction from the drum 14, which is terminated after a predetermined interval by the negative-going edges 28. Between the occurrence of the edges 27 and 28 the signals recorded on the drum are reproduced as shown in waveform (d) in which the fish echo signals 24d and 25d and the bottom echo signal 26d correspond to the signals 24b, 25b and 26b of waveform (b).

The selected bottom echo signal from the amplitude gate 18 is also applied to the variable delay circuit 21 and the output of the delay circuit is represented in waveform (e) of FIG. 4. The leading edge 29 is synchronised with the receipt of the bottom echo signal but the time of occurrence of the trailing edge 30 is adjustable for a purpose which will be described below. The trailing edge 30 triggers the sweep generator 20 which produces a time-varying output voltage represented schematically by the waveform (f) in which the output is represented as increasing negatively with time and following a curve 31.

The negative sign of the output waveform (f) is appropriate to the control of a PNP transistor amplifier which may be employed as the gated weighting amplifier 19. This amplifier is switched on only whilst the waveform (f) is negatively going. The curve 31, which would normally be non-linear, is used to control the gain of this amplifier whilst switched on. The resulting time-varying gain of the weighting amplifier 19 is represented in waveform (g) and the output of the weighting amplifier by waveform (h), in which the fish echo signals 24h and 25h correspond to the signals 24d and 25d of waveform (d). It will be noted that the shape of the fish echo signals has been changed and the relative amplitudes of the signals 24 and 25 have been reversed as a result of the probability weighting imposed by the weighting amplifier 19.

The gain of the amplifier 19 follows a curve 32 (waveform (g), FIG. 4), increasing from zero to a maximum from the time of its initiation by the trailing edge 30 of the output from the variable delay circuit 21 to the time of its termination by the end of the sweep waveform (f) from the sweep generator. The termination is arranged to occur just before the bottom echo signal 26d is replayed from the recording drum so that the amplifier 19 does not transmit this bottom echo signal to the counting indicator, since only fish echoes are to be counted. The time of initiation of the curve 32 may be varied by varying the time of occurrence of the trailing edge 30 of the output from the delay circuit 21 in order to alter the range of depths over which the fish are counted.

The output of the weighting amplifier 19, representing the corrected and weighted echo signals, is applied to an indicator 33 which integrates the echo signals and displays the integrated value on a counter, which thus displays an estimate of the likely catch. The indicator 33 includes a drive circuit 34 which rectifies the incoming signals and passes the rectified signals to a resistance-capacity integrating circuit 35 comprising a capacitor 36 chargeable through a resistor 37. The capacitor 36 can be discharged by a dischage device 38 operating under the control of a Schmidt trigger circuit 39. The Schmidt circuit 39 is connected to the capacitor 36 through a cathode follower circuit 40 and when the voltage across the capacitor reaches the trigger level of the Schmidt circuit the capacitor is discharged. The discharge of the capacitor 36 is arranged to generate, by means of a capacity-resistance circuit 41 of short time constant and a blocking oscillator 42, a pulse which is recorded by a counter 43 of the Dekatron type. This counter includes several decades with intermediate trigger stages and has a counting capacity sufficient to enable counting to be carried on for a period of hours.

The operation of the indicator 33 is illustrated by the waveforms of FIG. 6. Waveform (a) represents on an enlarged scale the output from the weighting amplifier 19 shown in waveform (h) of FIG. 4 and comprising fish echo signals 24a and 25a. The rectified output from the drive circuit 34 is shown in waveform (b) and consists of current pulses 44 and 45. Noise suppression may be effected by the drive circuit 34 by clipping of the central part of the signal between the values $+x$ and $-x$, giving a rectified waveform with a base level which is slightly positive, as shown in waveform (b) of FIG. 6.

Waveform (c) shows the charging and discharging of the capacitor 36 in terms of the output voltage from the cathode follower circuit 40. Two cases are shown, the one on the left corresponding to the use of a capacitor 36 of small capacity or a low triggering level and that on the right to the use of a capacitor of relatively large capacity or a relatively high triggering level. In the first case the small pulse 44 is sufficient to charge the capacitor 36 to the triggering level 46 of the Schmidt circuit 39. The charging follows the curve 47 and when the triggering level 46 is reached the capacitor is rapidly discharged, the voltage falling rapidly along the curve 48. The voltage then rises again to a level 49 which is maintained until the arrival of the pulse 45. This large pulse is sufficient to charge the capacitor several times and each time the trigger level 46 is reached the capacitor discharges, as shown at 50. The residual charge 51 on the capacitor 36 is retained until the arrival of a subsequent current pulse corresponding to another fish echo. In the second case the current pulse 44 is insufficient to charge the capacitor 36 to the triggering level 46 and only raises the voltage to the level 52. The pulse 45 raises the voltage to the triggering level and causes the discharge 53 and then raises the voltage to the level 54.

Waveform (d) of FIG. 6 shows the output of the Schmidt trigger circuit 39 with pulses 55 occurring each time the voltage across the capacitor 36 reaches the triggering level 46. The waveform (e) represents the negatively-going short pips 56 in the output of the capacity-resistance circuit 41, resulting from the discharges of the capacitor 36. The pips 56 are applied to the blocking oscillator 42 which consequently generates short pulses 57 (waveform (f)) for the operation of the counter 43.

The equipment of FIG. 3 represents a modification of that of FIG. 2. It incorporates many of the parts of that equipment, including the whole of the indicator 33. These parts have been given the same references as in FIG. 2 and will not be described again except to the extent that is necessary for understanding of the modifications of FIG. 3.

The amplitude gate 18 is not connected to the variable delay circuit 21 but controls a priming pulse generator 58. The priming pulse generator 58 generates priming pulses 59, which are shown in waveform (a) of FIG. 5. The trailing edges 60 of the priming pulses 59 occur when a bottom echo signal is received from the amplitude gate 18 and the leading edges 61 occur at a predetermined time after the previous trailing edge 60. This time is arranged to be slightly less than the interval between successive transmitted pulses so that priming occurs before the receipt of the next bottom echo signal.

In this equipment the signals recorded on the magnetic recording drum 14 are reproduced a plurality of times before the receipt of the next set of signals to be recorded, corresponding to the next transmitted pulse. The reproduced signals are shown as waveform (b) in FIG. 5 and include fish echo signals 65b and 66b and the bottom echo signal 67b, all occurring repeatedly as the recording drum 14 completes a series of revolutions. A time gating circuit 62 is primed by the priming pulses 59, producing a positive-going edge 63 in the output waveform (c) (FIG. 5) of the gating circuit 62. The reproduced signals from the drum 14 are supplied to the gating circuit 62 which includes an amplitude responsive selection circuit capable of selecting the bottom echo signal from the first cycle of echo signals reproduced from the recording drum and the negative-going edge 64 of the output waveform (c) occurs when the first reproduced bottom echo signal 67b is received.

The negative-going edge 64 of the waveform (c) triggers the variable delay circuit 21 which, as before, produces an output waveform (d) of FIG. 5 corresponding to waveform (e) of FIG. 4. The waveforms (e), (f) and (g) of FIG. 5 correspond exactly with the waveforms (f), (g) and (h) of FIG. 4 and carry the same reference numerals. The corrected and weighted fish echo signals 24h and 25h now result from the second cycle of reproduction of the echo signals recorded on the recording drum. The subsequent cycles of reproduction, which are applied to a cathode-ray tube display device to maintain a steady display, are not required to be counted and are excluded by virtue of the return of the gain of the weighting amplifier to zero at the end of the sweep 31 of the sweep generator 20. No further signals can be passed to the indicator 33 until the time gating circuit 62 is again primed by the forward edge 61 of the next priming pulse 59 and is thereby put in a condition to respond to another reproduced bottom echo signal and again initiate the swept gain of the weighting amplifier.

The control waveform generator 13 and the sweep generator 20 may be constructed in a similar manner to generate the desired waveforms in response to triggering signals. A Miller sawtooth generator is arranged to be triggered by the triggering signal and the output of the sawtooth generator is fed at different amplitudes to several distortion circuits. The outputs of the several distortion circuits are added together to synthesise the required waveform. Each distortion circuit may be so connected, for example by means of diodes, that it only comes into operation at a predetermined voltage level and its component is only added to the output above a predetermined voltage level.

In a further embodiment of the invention, not shown in the drawings, the weighting signal from the sweep generator circuit 20 is not applied directly to the reproducing amplifier 19. The reproduced signals are amplified by an amplifier of fixed gain and are passed through a time gate and an amplitude gate to a counter. The time gate is controlled by a pulse generator triggered by the output of the amplitude gate 18, or in the case of repeated reproduction by the first reproduced bottom echo signal, and is opened for a period appropriate to the selection of the reproduced fish echo signals from the desired range of depths. The amplitude gate selects only those fish echo signals having an amplitude greater than a pre-set limit and passes them to the counter. The counter produces an output voltage signal proportional to the rate at which it is receiving those fish echo signals and the output voltage signal is passed to a multiplier circuit which applies the probability weighting by multiplying the voltage signal from the counter by the weighting signal from the sawtooth generator. It will be recognised that the weighting signal must have a different waveform in this case from that used to control the gain of the weighting amplifier. The weighted signal is subsequently integrated and applied to a counter or other display device.

In all these embodiments a further modification of the received signals may be effected to compensate for changes in the number of echoes, or "pings," received from a given target. The number of pings depends upon the speed of the ship, the angular width of the acoustic sounding beam in the fore/aft direction, and the range of the target and control voltages representing these factors can be applied to modify the amplitude of the received echo signals in the required manner. This is conveniently done by modifying the waveform of the correction control waveform applied to the receiver amplifier. Modification of this waveform can also be effected to take account of the relative widths of the beam and trawl transverse to the movement of the ship, which varies with the depth of the trawl.

While in the embodiments described a magnetic recording device has been used as the delay device, this may be replaced by an electrical delay line.

When very low ultrasonic frequencies are used the fish echo amplitude is proportional to the volume of the fish. Assuming the length of the echo signal to be determined by the fixed length of the transmitted pulse this results in an integrated area proportional to the weight of fish likely to be caught. At higher frequencies a similar result can be achieved by squaring the echo signal voltages before counting.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. Echo-sounding equipment for the detection of fish having ultrasonic generating and receiving apparatus for transmitting pulses of ultrasonic wave energy into the sea and converting wave energy reflected from objects in the sea into electrical echo signals, a receiver amplifier connected to the said apparatus to amplify the echo signals, a correction circuit connected to apply an amplitude-correction waveform to the receiver amplifier to vary the amplification of the echo signals in accordance with the range from which they are received in such a manner as to compensate for the spread of the transmitted wave energy and its absorption in the sea, a selection circuit adapted to select from the echo signals a reference trigger signal originating from a reference depth, a weighting circuit connected to said selection circuit and responsive to the reference trigger signal to generate a weighting control waveform representative of the dependence of the probability of catch on depth and to modify the echo signals in accordance with this weighting signal, and an indicator constructed to indicate the accumulated magnitude of the echo signals which have been amplified by the receiver amplifier and supplied to said indicator by said weighting circuit.

2. Echo-sounding equipment as claimed in claim 1 comprising a delay device for delaying the echo signals, said weighting circuit comprising a weighting amplifier connected to receive the output of said delay device, said weighting amplifier being constructed so that the gain thereof is controlled by said weighting control waveform.

3. Echo-sounding equipment as claimed in claim 2 in which the selection circuit is amplitude-responsive and is constructed to select an echo from the sea bed as the reference trigger signal.

4. Echo-sounding equipment as claimed in claim 3 in which the delay device is a magnetic recording device.

5. Echo-sounding equipment as claimed in claim 4 including, a control circuit constructed to switch said magnetic recording device between record and reproduce conditions, said selection circuit being connected between the receiver amplifier and said control circuit.

6. Echo-sounding equipment as claimed in claim 3 in which the delay device is a magnetic recording device adapted to reproduce recorded signals a plurality of times before receipt of the next signals to be recorded and the selection circuit is connected to the magnetic recording device.

7. The combination set forth in claim 3, said delay device being a magnetic recording device constructed to reproduce recorded signals a plurality of times before receipt of the next signals to be recorded, said selection circuit being connected to said recording device, a control circuit adapted to switch the recording device between record and reproduce conditions and an amplitude gate connected between the receiver amplifier and the control circuit to actuate the control circuit for the commencement of reproduction on receipt of an echo from the sea bed.

8. Echo-sounding equipment as claimed in claim 1 in which the indicator comprises a capacitor connected to the output of the weighting circuit to be charged by the corrected and weighted signals, means for discharging the capacitor each time the charge on it reaches a predetermined value, and a counter connected to record the number of times the charge on the capacitor reaches the predetermined value.

References Cited in the file of this patent

UNITED STATES PATENTS 2,476,902 Paine et al. _____ July 19, 1949

FOREIGN PATENTS 785,001 Great Britain _____ Oct. 23, 1957
816,119 Great Britain _____ July 8, 1959
1,181,240 France _____ Jan. 5, 1959